United States Patent [19]
Bina et al.

[11] Patent Number: 5,464,027
[45] Date of Patent: Nov. 7, 1995

[54] HOPPER FOR ELONGATE ELEMENTS, IN PARTICULAR SMOKING ARTICLES

[75] Inventors: Roberto Bina; Andrea Nespoli; Antonio Gamberini, all of Bologna, Italy

[73] Assignee: G.D Societa per Azioni, Bologna, Italy

[21] Appl. No.: 195,273

[22] Filed: Feb. 14, 1994

[30] Foreign Application Priority Data

Mar. 5, 1993 [IT] Italy .................. BO93A0075

[51] Int. Cl.⁶ .................................................. B65B 19/10
[52] U.S. Cl. ............................................ 131/283; 131/282
[58] Field of Search .................... 131/282, 283; 53/148, 150, 151; 221/68, 92, 180, 200, 268

[56] References Cited

U.S. PATENT DOCUMENTS

| | | | |
|---|---|---|---|
| 2,334,142 | 11/1943 | Arelt | 53/151 X |
| 2,809,768 | 10/1957 | Pollmann et al. | 221/68 |
| 3,127,971 | 4/1964 | Schmermund | 221/68 X |
| 3,241,289 | 3/1966 | Molins | 53/151 X |
| 3,435,940 | 4/1969 | Seragnoli | 53/151 X |
| 4,614,263 | 9/1986 | Nagata et al. | 53/151 X |
| 5,201,162 | 4/1993 | Focke | 131/283 X |

*Primary Examiner*—Jennifer Bahr
*Attorney, Agent, or Firm*—Ladas & Parry

[57] ABSTRACT

A hopper (5) for elongate elements (2), in which an exit (11) of the hopper (5) is defined by a plurality of substantially vertical side-by-side channels (17); each channel (17) is defined by two substantially vertical baffles (18), and is associated with an agitator element (24) of pendulum type having a substantially triangular cross-sectional shape and positioned above a respective baffle (18) to oscillate, in synchronism with the other agitator elements (24), about a respective substantially horizontal axis (25).

14 Claims, 3 Drawing Sheets

HOPPER FOR ELONGATE ELEMENTS, IN PARTICULAR SMOKING ARTICLES

This invention relates to a hopper for elongate elements, in particular smoking articles.

The invention relates particularly to a hopper of the type comprising a chamber for receiving an orderly mass of elongate elements, a channel for feeding the elongate elements into the chamber, and at least one exit comprising a plurality of channels, each arranged to enable a relative continuous row of elongate products to descend.

Although usable for the orderly feed of elongate articles to any user machine, the hopper of the present invention finds particularly advantageous application in the production and packeting of smoking articles such as cigarettes and the like, for example for the orderly feed of filters to a filter fitting machine and/or for the orderly feed of cigarettes to a box filling device or to a packeting machine.

In the ensuing description, the hopper of the present invention is described, but without losing its generality, with reference to its use on a cigarette packeting machine, and for feeding orderly rows of cigarettes to a pocket conveyor for forming a succession of groups, each representing the contents of one packet of cigarettes.

To facilitate the entry and subsequent advancement of cigarettes within the exit channels, it is known to provide hoppers of the aforesaid type with an agitator device, which is positioned within said chamber and comprises for each exit channel of the chamber a substantially horizontal agitator element, consisting normally of a bar of regular polygonal cross-section associated with a drive unit to cause it to oscillate about a respective central longitudinal axis with a frequency substantially equal to the number of packets produced by the relative packeting machine per unit of time.

The aforesaid known hoppers have certain drawbacks deriving from the structure and method of operation of the said known agitator device. These drawbacks derive mainly from the fact that because of their relatively high oscillation frequency, the agitator elements do not allow the cigarette sufficient time to settle and comply with the movement of the agitator elements, with the result that some cigarettes are "chewed up" by the agitator elements, with consequent stoppage of the packeting machine. Again, it has been noted that for lower oscillation frequencies the aforesaid known agitator elements are sometimes unable to homogenize the mass of cigarettes present upstream of said channels by eliminating any "bridges" which the cigarettes tend to form during their descent along the hopper.

In addition, while using the aforesaid agitator devices it has been found that cigarettes travelling through said exit channels sometimes have a tendency, because of air vortices generated within the channels, of undergoing momentary upward movements along the channels, so limiting the operating rate of said user machines or making their high-speed operation less reliable. The object of the invention is to provide a hopper free from the aforesaid drawbacks.

The present invention provides a hopper for elongate elements, in particular smoking articles, at a user machine, the hopper comprising an entry chamber for receiving a mass of elongate elements arranged in a substantially horizontal position; at least one exit comprising a plurality of substantially vertical side-by-side channels, each channel being defined by two substantially vertical baffles; and agitator means positioned within said entry chamber and associated with said channels to facilitate the entry and descent of continuous rows of elongate elements along said channels; characterised in that for each channel, said agitator means comprise at least one agitator element of pendulum type positioned above a respective said baffle to oscillate about a respective substantially horizontal axis.

Preferably, the aforedefined hopper is an entry hopper of a cigarette packeting machine arranged to produce a determined number of packets per unit of time; drive means being provided to transmit to each agitator element oscillations about the relative axis in synchronism with the other agitator elements, at a frequency less than said determined number.

In a preferred embodiment of the aforedefined hopper, each agitator element comprises a bar which is parallel to the respective said axis, is eccentric to said axis, and in cross-section has a shape tapering towards the end distant from the relative said baffle, and in particular a substantially triangular shape with its base facing the relative said baffle and symmetrical about a vertical plane passing through the relative axis.

The present invention is described hereinafter with reference to the accompanying drawings, which illustrate a non-limiting embodiment thereof and in which:

FIG. 3 is a section through a detail of FIGS. 1 and 2 to an enlarged scale; and

Figure 1:
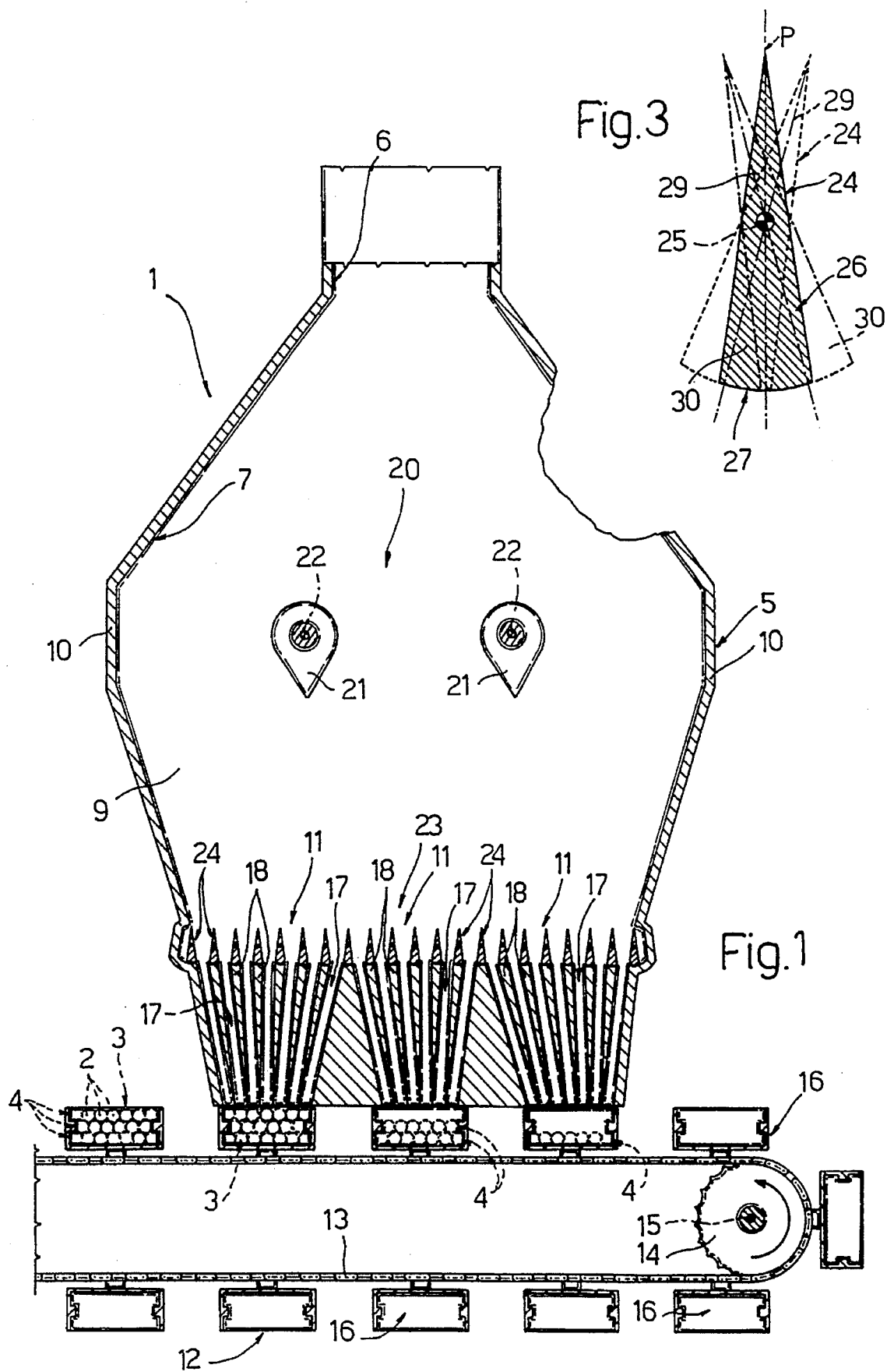
FIG. 1 is an elevational view, with parts shown in section and parts removed for clarity, of a preferred embodiment of the hopper according to the present invention.

In FIG. 1 the reference numeral 1 indicates a cigarette 2 packeting machine arranged to produce per unit of time a determined number of packets (not shown), each comprising a relative group 3 of cigarettes 2 positioned preferably along three overlying layers 4.

The machine 1 contains a hopper 5 comprising an entry channel 6 and a central chamber 7 defined by a front flat wall 8 (FIG. 4), a rear flat wall 9, and two side walls 10, and arranged to receive and hold an orderly mass M of cigarettes 2 arranged in substantially horizontal positions perpendicular to the walls 8 and 9. The hopper 5 also comprises three adjacent exits 11 each located in a position facing a delivery branch of a known pocket conveyor 12 for forming the groups 3.

In particular, the conveyor 12 is a stepwise conveyor, and comprises a chain 13 passing about two pulleys 14 (only one of which is visible in FIG. 1) rotatable in the anticlockwise direction in FIG. 1 about respective axes 15 perpendicular to the walls 8 and 9 and to the plane of FIG. 1. The conveyor 12 also comprises a plurality of pockets 16 uniformly distributed along the chain 13 and arranged to each receive a relative group 3, which is formed during the advancement of the relative pocket 16 in front of said exits 11.

Figure 2:
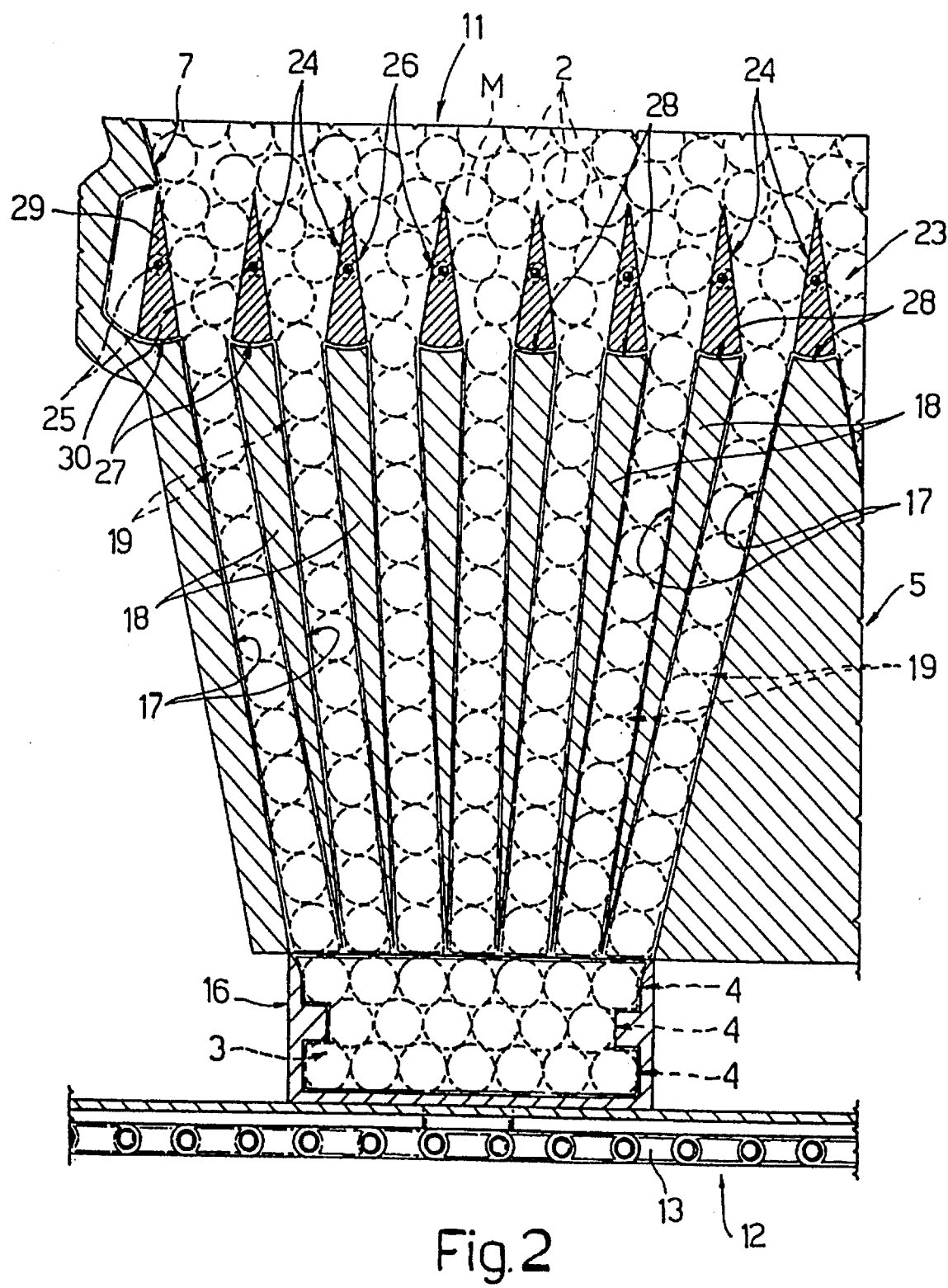
FIG. 2 is a section through a detail of FIG. 1 to an enlarged scale.

Again with reference to FIG. 1 and, in particular, to FIG. 2, the exits 11 each comprise a plurality of substantially vertical side-by-side channels each defined by two substantially vertical baffles and arranged to each allow the descent of a relative continuous row 19 of cigarettes 2.

The advancement of the cigarettes 2 within the chamber 7 is facilitated by a first known agitator device 20 positioned centrally within the chamber 7 and comprising two motorized agitator elements 21 each oscillating about a relative substantially horizontal axis 22 with known frequency and amplitude. The entry and advancement of the cigarettes 2 within each channel 17 is instead facilitated by a second agitator device 23 positioned within the chamber 7 in proximity to the upper end of the channels 17 and comprising, for each baffle 18, an agitator element 24 of pendulum type positioned above the baffle 18 and connected to the walls 8 and 9 to oscillate about a relative substantially horizontal axis 25 perpendicular to said walls 8 and 9.

Each element 24 comprises a horizontal bar 26 extending between the walls 8 and 9 in a position eccentric to (the respective axis 25 and having a cross-section of substantially triangular shape tapering towards the end distant from the relative baffle 18 and symmetrical about a plane P passing through the axis 25. At the end facing the relative baffle 18, each bar 26 is bounded by a convex curved surface 27 complementary to the concave curved surface 28 upperly bounding the relative baffle 18, and giving the cross-section of the bar 26 substantially the form of a circular sector. The cross-section of each bar 26 has an upper portion 29 lying above the axis 25 and a lower portion 30 lying below the axis 25. The lower portion 30 preferably has a-length, measured along the plane P, less than the length of the portion 29.

Figure 4:
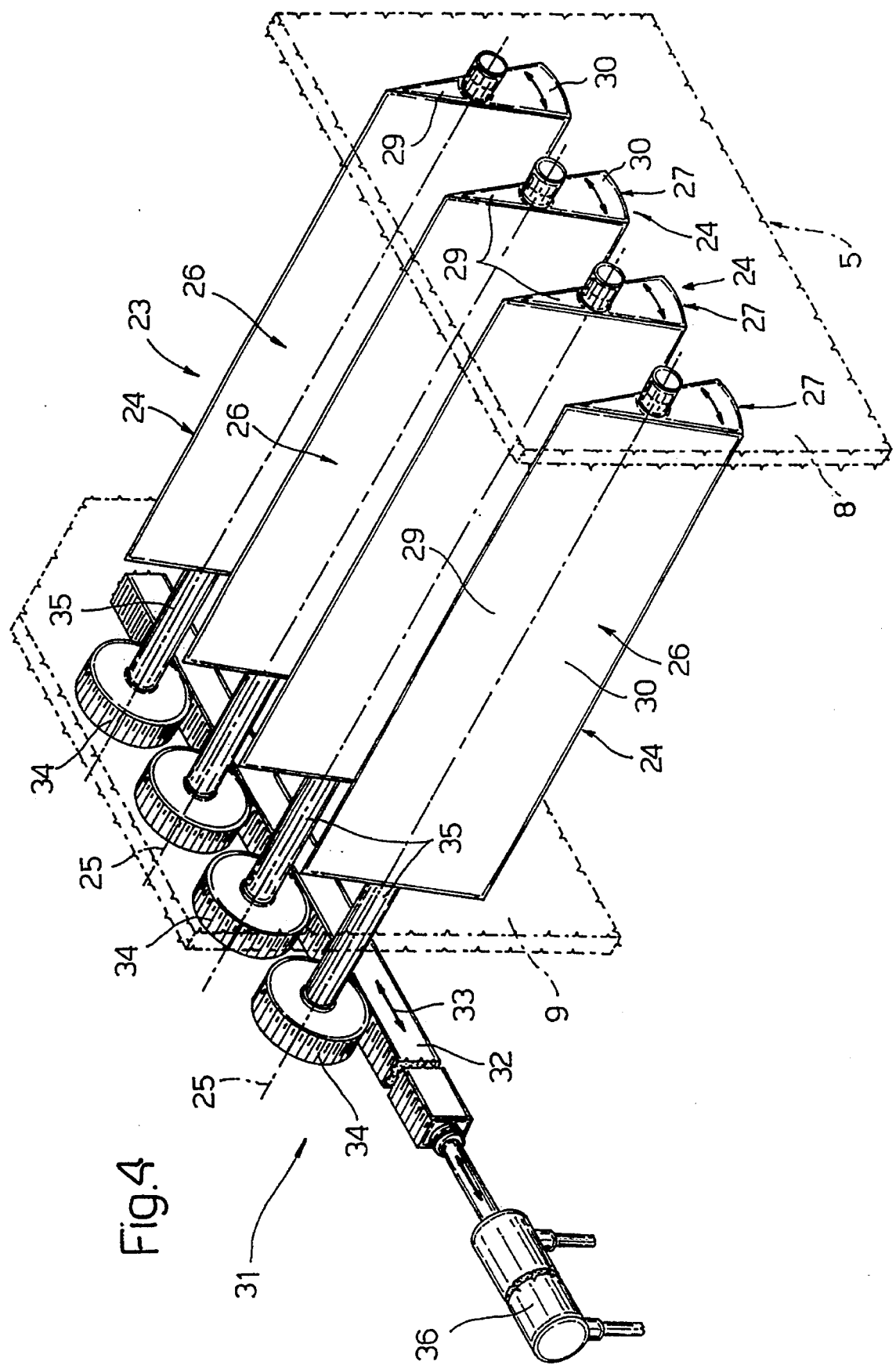
FIG. 4 is a perspective view of a detail of FIGS. 1 and 2.

As shown in FIG. 4, the elements 24 are movable with oscillatory motion relative to the walls 8 and 9 about the respective axes 25 under the thrust of a rack and pinion drive unit 31 positioned outside the hopper 5 and comprising a rack 32 common to all the elements 24 and extending in a direction 33 perpendicular to the axes 25, and for each element 24 a pinion 34 meshing with the rack and keyed on a relative shaft 35 coaxial with the relative axis 25 and rigid with the relative element 24.

The rack 32 is movable with reciprocating rectilinear movement in the direction 33 under the thrust of a known actuator 36, which can be of any type and is arranged to axially move the rack 32 in such a manner as to cause the elements 24 to oscillate about the respective axes 25 with a frequency less than the number of packets of cigarettes 2 produced by the machine 1, and an amplitude less than 90°, and preferably of the order of 45°, in both directions about a vertical position, In practice it has been found that because of their pendulum form, the elements 24 are able to effectively eliminate any "bridges" formed by the cigarettes 2 within the chamber 7 by oscillating at relatively low frequency, so applying a relatively small force the cigarettes 2 and in any event such as not to result in breakage and/or emptying of the cigarettes 2.

We claim:

1. A hopper (5) for elongate elements (2) at a user machine (1), the hopper (5) comprising an entry chamber (6) for receiving a mass (M) of elongate elements (2) arranged in a substantially horizontal position; at least one exit (11) including a plurality of substantially vertical side-by-side channels (17), each channel (17) being defined by two substantially vertical baffles (18); and agitator means (23) positioned within said entry chamber (7) and associated with said channels (17) to facilitate the entry and descent of continuous rows (19) of elongate elements (2) along said channels (17); wherein for each channel (17), said agitator means (24) includes at least one agitator element (24) positioned above a respective said baffle (18) to oscillate about a respective substantially horizontal axis (25), said agitator element (24) including a bar (26) located parallel to the respective said substantially horizontal axis (25) and eccentric to said substantially horizontal axis (25), said bar (26) having a cross-sectional shape tapering towards the end distant from the relative said baffle (18).

2. The hopper as claimed in claim 1, wherein the hopper is an entry hopper (5) of a cigarette (2) packeting machine (1) arranged to produce a determined number of packets per unit of time and includes drive means (31) being provided to transmit to each agitator element (24) oscillations about the relative substantially horizontal axis (25) in synchronism with the other agitator elements (24), at a frequency less than said determined number.

3. The hopper as claimed in claim 2, wherein drive means (31) are provided for impressing on each agitator element (24) oscillations with an amplitude of less than 90° about the relative substantially horizontal axis (25).

4. The hopper as claimed in claim 2, wherein each said substantially horizontal axis (25) defines, on a section of the relative agitator element (24) transverse to said substantially horizontal axis (25), an upper portion (29) and a lower portion (30); the lower portion (30) having a length, measured in a vertical direction, of less than that of the upper portion (29).

5. The hopper as claimed in claim 1, wherein drive means (31) are provided for impressing on each agitator element (24) oscillations with an amplitude of less that 90° about the relative substantially horizontal axis (25).

6. The hopper as claimed in claim 5, wherein each said substantially horizontal axis (25) defines, on a section of the relative agitator element (24) transverse to said substantially horizontal axis (25), an upper portion (29) and a lower portion (30); the lower portion (30) having a length, measured in a vertical direction, of less than that of the upper portion (29).

7. The hopper as claimed in claim 5, wherein said drive means (31) is arranged to impress on each agitator element (24) oscillations of substantially 45° in both directions about a vertical position.

8. The hopper as claimed in claim 7, wherein each said substantially horizontal axis (25) defines, on a section of the relative agitator element (24) transverse to said substantially horizontal axis (25), an upper portion (29) and a lower portion (30); the lower portion (30) having a length, measured in a vertical direction, of less than that of the upper portion (29).

9. The hopper as claimed in claim 1, wherein each said substantially horizontal axis (25) defines, on a section of the relative agitator element (24) transverse to said substantially horizontal axis (25, an upper portion (29) and a lower portion (30) having a length, measured in a vertical direction, of less than that of the upper portion (29).

10. The hopper as claimed in claim 9, wherein said bar (26) has a cross-sectional shape symmetrical about a vertical plane (P) passing through the relative said substantially horizontal axis (25).

11. The hopper as claimed in claim 10, wherein said bar (26) has a cross-section substantially in the form of a circular sector including a curved side (27) facing the upper end of the relative baffle (18).

12. The hopper as claimed in claim 11, wherein each baffle (18) is upwardly bounded by a curved surface (28) having, in cross-section, a curved profile substantially complementary to said curved side (27).

13. The hopper as claimed in claim 10, wherein said bar (26) has a substantially triangular cross-sectional shape with its base facing the relative said baffle (18).

14. The hopper as claimed in claim 9, wherein said bar (26) has a substantially triangular cross-sectional shape with its base facing the relative said baffle (18).

* * * * *